US009846638B2

(12) United States Patent
Koneru et al.

(10) Patent No.: US 9,846,638 B2
(45) Date of Patent: *Dec. 19, 2017

(54) EXPOSING METHOD RELATED DATA CALLS DURING TESTING IN AN EVENT DRIVEN, MULTICHANNEL ARCHITECTURE

(71) Applicant: Kony, Inc., Orlando, FL (US)

(72) Inventors: Raj K. Koneru, Windermere, FL (US); Pattabhi Rama Rao Dasari, Hyderabad (IN); Prajakt Deshpande, Hyderabad (IN); Jason Evans, Ringgold, GA (US); Rajendra Komandur, Hyderabad (IN); Sriram Ramanathan, Lutz, FL (US); Matthew Terry, Celebration, FL (US); Matthew B. Trevathan, Roswell, GA (US); Sathyanarayana Vennapusala, Hyderabad (IN)

(73) Assignee: KONY, INC., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/053,311

(22) Filed: Feb. 25, 2016

(65) Prior Publication Data
US 2016/0170867 A1 Jun. 16, 2016

Related U.S. Application Data

(63) Continuation of application No. 14/098,987, filed on Dec. 6, 2013.

(Continued)

(51) Int. Cl.
G06F 9/44 (2006.01)
G06F 11/36 (2006.01)
(Continued)

(52) U.S. Cl.
CPC ........ *G06F 11/3692* (2013.01); *G06F 3/0482* (2013.01); *G06F 3/04842* (2013.01);
(Continued)

(58) Field of Classification Search
CPC .................................................. G06F 11/3692
(Continued)

(56) References Cited

U.S. PATENT DOCUMENTS 6,957,366 B1 * 10/2005 McDonald .......... G06F 11/3688
714/38.14
7,339,891 B2 3/2008 Binder et al.
(Continued)

OTHER PUBLICATIONS

Ridene et al, "A Model-Driven Approach for Automating Mobile Applications Testing", ACM, pp. 1-7, 2011.*
(Continued)

*Primary Examiner* — Anil Khatri
(74) *Attorney, Agent, or Firm* — Andrew M. Calderon; Roberts Mlotkowski Safran Cole & Calderon, P.C.

(57) ABSTRACT

Approaches for application testing are provided. An approach includes transmitting a command to an agent associated with an application installed on a mobile device. The approach includes receiving from the agent information about an executed step of the application on the mobile device. The approach includes comparing the information to an expected value of the step. The approach includes display an output based on the comparing.

22 Claims, 12 Drawing Sheets

Related U.S. Application Data

(60) Provisional application No. 61/767,018, filed on Feb. 20, 2013.

(51) Int. Cl.
*G06F 3/0482* (2013.01)
*G06F 3/0484* (2013.01)

(52) U.S. Cl.
CPC ...... *G06F 11/3664* (2013.01); *G06F 11/3684* (2013.01); *G06F 11/3688* (2013.01)

(58) Field of Classification Search
USPC ................................. 717/123–129
See application file for complete search history.

(56) References Cited

U.S. PATENT DOCUMENTS

| | | | |
|---|---|---|---|
| 7,343,586 B1 | 3/2008 | Hernandez, III | |
| 7,386,837 B2* | 6/2008 | Creamer | G06F 11/3476 709/202 |
| 7,603,660 B2* | 10/2009 | Davia | G06F 11/3676 717/103 |
| 7,703,075 B2 | 4/2010 | Das et al. | |
| 7,773,964 B2 | 8/2010 | Ozaki et al. | |
| 7,784,030 B2* | 8/2010 | Christfort | G06F 8/20 709/203 |
| 7,788,642 B2 | 8/2010 | Sohm et al. | |
| 7,925,253 B2 | 4/2011 | Breit et al. | |
| 7,925,952 B1 | 4/2011 | Katz et al. | |
| 7,930,683 B2* | 4/2011 | Li | G06F 8/71 717/124 |
| 8,019,588 B1 | 9/2011 | Wohlberg et al. | |
| 8,028,188 B2* | 9/2011 | Karthikeyan | H04L 43/50 455/423 |
| 8,091,072 B2* | 1/2012 | Shah | G06F 11/3688 717/124 |
| 8,141,043 B2 | 3/2012 | Jones et al. | |
| 8,185,877 B1* | 5/2012 | Colcord | G06F 9/44 717/124 |
| 8,196,112 B1* | 6/2012 | Cansizlar | G06F 11/3672 717/116 |
| 8,271,950 B2 | 9/2012 | Bharadwaj | |
| 8,402,446 B2 | 3/2013 | Singh | |
| 8,479,164 B2 | 7/2013 | Becker et al. | |
| 8,533,682 B2 | 9/2013 | Kakulamarri et al. | |
| 8,566,648 B2 | 10/2013 | Schroeder | |
| 8,694,964 B1 | 4/2014 | Picard | |
| 8,694,966 B2* | 4/2014 | Gupta | G06F 9/44 717/124 |
| 8,701,092 B1 | 4/2014 | Colcord | |
| 8,739,126 B2 | 5/2014 | Glaser et al. | |
| 8,782,603 B2 | 7/2014 | Plate | |
| 8,793,660 B2* | 7/2014 | Belihomji | G06F 11/3668 714/38.1 |
| 8,806,446 B2 | 8/2014 | Kilbane | |
| 8,819,630 B2* | 8/2014 | Chen | G06F 11/3688 717/124 |
| 8,819,638 B2* | 8/2014 | Sharma | G06F 11/3688 714/37 |
| 8,856,748 B1 | 10/2014 | Larsen et al. | |
| 8,881,111 B1* | 11/2014 | Smith | G06F 11/3692 717/125 |
| 8,918,762 B2 | 12/2014 | Jensen et al. | |
| 8,930,766 B2* | 1/2015 | Griesinger | G06F 11/3676 714/33 |
| 8,966,446 B1* | 2/2015 | Amacker | G06F 11/3688 709/225 |
| 8,978,014 B1 | 3/2015 | Larsen et al. | |
| 9,021,436 B2* | 4/2015 | Sathya | G06F 11/3656 717/124 |
| 9,021,438 B2* | 4/2015 | Dayan | G06F 11/3692 717/124 |
| 9,021,443 B1* | 4/2015 | Lachwani | G06F 11/3664 717/124 |
| 2005/0204343 A1 | 9/2005 | Kisamore et al. | |
| 2007/0171473 A1 | 7/2007 | Iwasaki | |
| 2011/0225417 A1 | 9/2011 | Maharajh et al. | |
| 2011/0320879 A1 | 12/2011 | Singh et al. | |
| 2012/0036220 A1 | 2/2012 | Dare et al. | |
| 2013/0055083 A1 | 2/2013 | Fino | |
| 2013/0179830 A1 | 7/2013 | Lee et al. | |

OTHER PUBLICATIONS

Rojas et al, "Cloud-Based Mobile App Testing Framework: Architecture, Implementation and Execution", ACM, pp. 1-10, 2016.*
Bernaschina et al, "A Framework for Regression Testing of Outdoor Mobile Applications", IEEE, pp. 179-181, 2017.*
Kim et al, "Performance Testing based on Test-Driven Development for Mobile Applications", ACM, pp. 612-617, 2009.*
Puhakka et al, "Towards Automating Testing of Communicational 3G Applications", ACM, pp. 1-6, 2006.*
Vilomir et al, "Effectiveness of Multi-device Testing Mobile Applications", IEEE, pp. 44-47, 2015.*
Yu et al, "External Event-Based Test Cases for Mobile Application", ACM, pp. 1-2, 2015.*
"Native Application Instrumentation", Experitest Ltd, http://experitest.com/studio/help2/WebHelp/Native_Application_Instrumentation_.htm, 5 Pages, Accessed Dec. 5, 2013.
Prathibhan et al., "An Automated Testing Framework for Testing Android Mobile Applications in the Cloud", IEEE, pp. 1216-1219, 2014, 4 pages.
Vilkomir et al., "Effectiveness of Multi-device Testing Mobile Applications", IEEE, pp. 44-47, 2015, 4 pages.
Kirubakaran et al., "Mobile Application Testing—Challenges and Solution Approach through Automation", IEEE, pp. 79-84, 2013, 6 pages.
Hai-ru et al., "A Mobile Agent based General Model for Web Testing", IEEE, pp. 158-161, 2009, 4 pages.
Hortelano et al., "Testing Applications in MANET Environments through Emulation" EURASIP Journal onWireless Communications and Networking, Article ID 406979, pp. 1-20, 2009, 20 pages.
Candea et al. "Automated Software Testing as a Service", ACM, pp. 155-160, 2010, 6 pages.
Notice of Allowance in related U.S. Appl. No. 14/098,982 dated May 24, 2016, 8 pages.

* cited by examiner

EXPOSING METHOD RELATED DATA CALLS DURING TESTING IN AN EVENT DRIVEN, MULTICHANNEL ARCHITECTURE

FIELD OF THE INVENTION

The present invention relates generally to mobile applications and, more particularly, to systems and method of testing mobile applications.

BACKGROUND OF THE INVENTION

Mobile application development is the process by which application software is developed for handheld devices, such as personal digital assistants, enterprise digital assistants, mobile phones (e.g., smart phones), tablet computers, etc. Mobile applications (e.g., "apps") can be pre-installed on devices during manufacturing, downloaded by customers from various mobile software distribution platforms, or delivered as web applications using server-side or client-side processing to provide an application-like experience within a web browser.

It is common for an application developer to test an application before releasing the application to the end user. Testing may be used to find and fix errors in an application so that, once released, the end user has a positive user experience when using the application. Mobile applications may be initially tested within the development environment using emulators and later subjected to field testing. Emulators provide an inexpensive way to test applications on mobile devices to which developers may not have physical access. Many aspects of application testing are performed manually, which leads to the application testing process as a whole being time consuming and expensive.

SUMMARY OF THE INVENTION

In accordance with aspects of the invention, there is a method of application testing that includes transmitting a command to an agent associated with an application installed on a mobile device. The method also includes receiving from the agent information about an executed step of the application on the mobile device. The method additionally includes comparing the information to an expected value of the step. The method further includes display an output based on the comparing. The transmitting, the receiving, the comparing, and the displaying are performed by a computing device.

In accordance with additional aspects of the invention, there is a system for testing applications. The system includes a test server comprising a test control is adapted to: record a test case of a mobile application; remotely control running the test case on a mobile device; receive information about execution of the mobile application during the test case on the mobile device; compare the information to an expected result; and display an output based on the comparing.

In accordance with further aspects of the invention, there is a computer system for testing an application, the system including a CPU, a computer readable memory, and a computer readable storage media. The system includes program instructions to communicate with an agent loaded on a mobile device to remotely control running a test case of the application on the mobile device. The system also includes program instructions to receive, from the agent loaded on the mobile device, information associated with a function called by the application during the test case on the mobile device, wherein the information comprises a name of the function, an input to the function, and a return of the function based on the input. The system further includes program instructions to display the information and a screenshot of the mobile device associated with the function. The program instructions are stored on the computer readable storage media for execution by the CPU via the computer readable memory. The receiving and the displaying are performed at a test server that is separate from the mobile device.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

Figure 1:
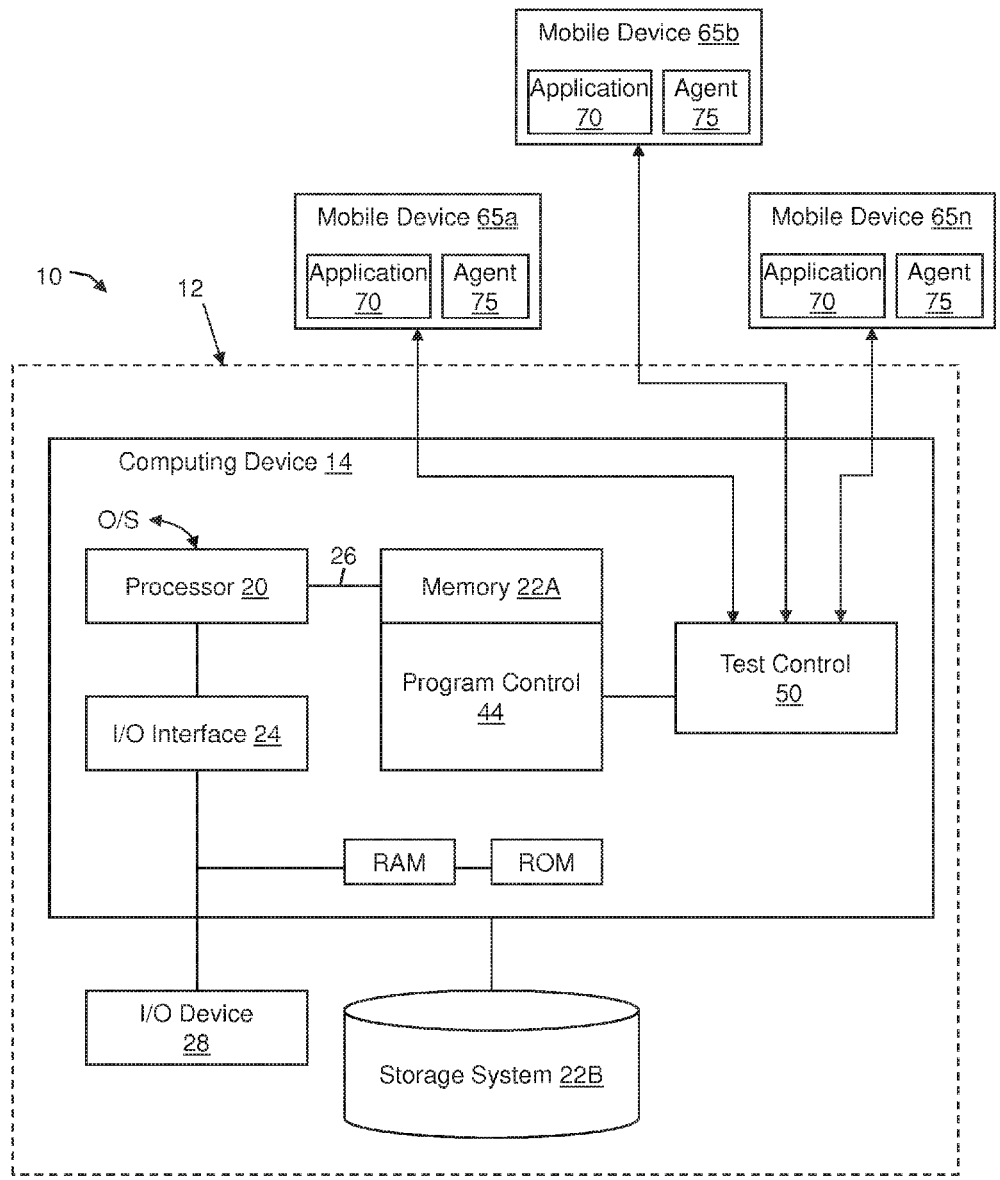
FIG. 1 shows an illustrative environment for managing the processes in accordance with the invention.

The present invention relates generally to mobile applications and, more particularly, to systems and methods of testing mobile applications. More particularly, the invention facilitates testing an application running on a mobile device by leveraging the use of an agent installed on the mobile device or the use of a javascript library for web based applications. In embodiments, the agent or script (referred to herein simply as the agent) provides a mechanism for exposing methods and data within the application that are associated with events the application performs while running on the mobile device. In this manner, implementations of the invention provide a concise view of the testing steps that occur along with the resulting view created by the event when the application is being tested.

In accordance with aspects of the invention, the agent resides on the mobile device and acts as a reporter for the application that is running on the mobile device. In embodiments, the agent reports information associated with the application to a test server which may be part of a test management system. The information may include, for example, but is not limited to: application performance, memory usage, visual layout, called methods, inputs and outputs from the screen, and any variables the developer marks for introspection (e.g., monitoring). In embodiments, the server receives the information from the agent and performs any desired comparisons and testing logic (e.g., validation) for testing the application, in accordance with aspects of the present invention. According to aspects of the invention, the output of each step highlights the screen shot of the resulting event, the inputs and outputs from the screen of the mobile device, the functions called by the application, and any variables set out by the developer to watch (e.g., monitor).

More specifically, implementations of the invention provide a developer a comprehensive view of what happens when an event occurs in an application. This is accomplished by not only providing a screen shot and high level inputs and outputs of the event, but by also allowing the developer to see what underlying methods were called by the event and the inputs and returns of these methods. By way of example, in embodiments, a library is injected to the application code and is configured to inspect what methods are called when an event is fired in the application. Also, in aspects of the invention, variables can be marked (by the developer) to watch (e.g., monitor) in the testing process and then these variables can be correlated to a method being fired in the application. In addition, constraints can be set on an introspected (e.g., monitored) variable, such as, for example: regular expressions; determine if the value is undefined; determine if the value is defined; determine if a value is null; determine if the resulting value is true, false, equal, greater than, less than, greater than or equal to, and less than or equal to. Aspects of the invention may also be adapted to support 'close to' comparisons for comparing floating point values, e.g., a value of 3.14159 is close to 3.14. Also, aspects of the invention allow a developer to determine when exceptions have been thrown as expected.

It should be understood that browser based testing can have multiple challenges in a mobile and desktop environment since there is a wide range of browsers to support. For example, code introspection and remote controlling of a multiple browsers is a difficult task with ongoing maintenance concerns, as well as noted differences in which browsers can report an object that is in the same location. For example, where pixel comparison may show the pages are equal, layout comparison may show a multipixel difference in location, height or width. Also, there is an inherent complexity of taking screenshots on each platform. Although the functions may, overall stay the same, there may be presentation nuances that are presented when tests are run across channels. In view of these and other issues, the present invention provides a testing system which provides many advantages over current manual processes, as described herein.

Application Testing

Implementations of the invention may be directed to automating aspects of application testing. By implementing the automated aspects of the present invention, testing throughout the software lifecycle is greatly improved. In addition, it is now possible to improve visibility into backlog through defect tracking system integration, as well as reduce the number of testers needed to perform testing and reduce errors introduced by manual testing. It is also now possible to automate repeatable processes for consistency allowing testers to use test cases as building blocks for larger test scenarios, provide deep coverage in all areas of the application under test, and produce automated reports based on testing process.

According to aspects of the invention, a multichannel automated testing solution focuses on one or more of the following building blocks of testing: unit testing, functional testing, data testing, and user experience testing. These different testing techniques in accordance with aspects of the present invention are described below, in detail.

Unit Testing

Unit testing provides developers with a mechanism for testing a unit of code of an application to detect problems before the application is passed to the tester. In embodiments, unit testing tests individual functions in isolation with the ability to set preconditions and post conditions. Unit testing also allows grouping smaller tests into larger scenarios. Unit testing also includes tolerance testing, regular expression and range function testing. According to aspects of the invention, application developers can unit test locally and store the unit test within a test server. In embodiments, aspects of unit testing may be automated by integrating unit testing into the application build process (e.g., build management system) with application programming interfaces (API's) that can be called from software.

Functional Testing

Functional testing provides testers with the ability to validate expected navigation and behaviors of the application. In embodiments, functional testing monitors the behavior of the application to ensure the application displays the correct outputs, navigates correctly, and correctly responds to swipes, taps, inputs and other gestures, for example. In this manner, functional testing tests the inputs and outputs of the application from the 'glass' or screen perspective of the mobile device on which the application is run.

Data Testing

Data testing ensures that the information used for testing is correct. In embodiments, data testing includes testing of services and data throughout the application lifecycle. Initial data testing provides a mechanism for ensuring data quality with back end systems. Other aspects of data testing, called introspection, focus on what methods are called by the application being tested, what data is passed between methods, and the order in which these methods are called. In this manner, data testing ensures that data from external services is correct and gives developers insight into key data points within their application in relation to the testing steps and process.

User Experience Testing

User experience (UX) testing provides a mechanism for testing the overall user experience through the use of layout validation in conjunction with pixel comparison. In embodiments, UX testing ensures that objects display correctly on the mobile device screen, including ensuring that text boxes, labels, and other user interface components are properly displayed in a correct format. In this manner, implementations of the invention create a robust, automated testing mechanism that can compare dynamic, repeating content as well as understand specific areas of both layout and pixel comparison.

For example, UX testing compares objects on the view and their properties, such as height, width, location on the page and other widget level properties, and can create repeating patterns that recognize when visual objects repeat on the page so the testing automation system can test complex, repeating user interfaces. The UX testing can also test static areas of a view using pixel comparison, which allows a tester to select a specific area for image comparison or detect text overruns as examples.

Exemplary Application Testing

An exemplary application testing scenario in accordance with aspects of the invention is as follows. First, a developer creates an application, sets the application to test mode, and publishes the application to a testing application store. Next, a tester (e.g., one or more users in a test team) downloads the application from the testing application store to one or more mobile devices. In embodiments, the tester records one or more new test cases by, e.g.: logging on to a test workbench (e.g., a software interface of a test server adapted for, among other things, software-based control of test applications installed on mobile devices); opening a recording dialog; selecting the mobile device with the application installed; beginning recording the new script; and manipulating the application using the device while the test system is recording. At each page (e.g., different screen) of the application on the mobile device, the test server saves a screenshot of the view on the mobile device, saves any objects on the page and their layout properties, and saves any inputs to and outputs from methods of the application.

Still referring to the exemplary application testing scenario in accordance with aspects of the invention, the tester may edit the recorded test case prior to performing functional and/or UX testing. For example, the tester may open the recorded test case using a test workbench, look at each view that was produced in the test case, and mark objects from one or more views for validation. The test workbench may be programmed with default values for some validation fields. In other validation fields, the tester may define or import one or more values, e.g., values such as username and password, which may change with each test run. For example, the tester may import a spreadsheet from another device, and assign columns in the spreadsheet to a field of the test case for dynamic validation. The tester may also change the timeout of one or more back end calls, e.g., to account for back end server performance. The tester may also change the time-to-think that was recorded by the test server when the test case was recorded, e.g., to make the test run faster between screens and/or applications selections that do not require back end service calls. The tester may save the edited test case at the test server for later running tests of the application on one or more mobile devices. When a test case is recorded, it captures the values of that were associated with the object. For instance, if an object's test.properties="Andrew was here" the default value after the test is recorded is "Andrew was here". The tester may override this text with new text using the text workbench.

With continued reference to the exemplary application testing scenario in accordance with aspects of the invention, the tester may perform functional testing and/or UX testing using the saved test case including automated scripts. In embodiments, functional testing and UX testing may each include: selecting a saved test case from a testing menu of the test workbench; using the test workbench to select a device on which to run the test; running the test on the mobile device from the test server; recording the results of the test at the test server; and checking the results of the test. Functional testing may specifically include the test server recording at each step of the test for each mobile device: a screen shot of the application at the mobile device; any functions called by the application including the order in which the functions were called; and any variables the tester set for watches in the application code. UX testing may specifically include the test server: receiving layout information from the mobile device running the application; comparing the received layout information to layout information that was stored when recording the test case; and marking as possible defects those filed that do not match.

System Environment

The present invention may be embodied as a system, method or computer program product. The present invention may take the form of a hardware embodiment, a software embodiment or a combination of software and hardware. Furthermore, the present invention may take the form of a computer program product embodied in a computer readable storage medium of expression having computer-usable program code embodied in the medium. The computer-usable or computer-readable medium may be any medium, apparatus, or device that can contain, store and communicate the program for use by or in connection with an instruction execution system, apparatus, or device. The computer readable storage medium may be, for example, an electronic, magnetic, optical, electromagnetic, infrared, or semiconductor system, apparatus, or device.

FIG. 1 shows an illustrative environment 10 for managing the processes in accordance with the invention. The environment 10 includes a server 12 or other computing system. The server 12 can be test server that is part of a test management system used for testing applications on mobile devices. In embodiments, the server 12 can be a standalone server, which implements the processes of the present invention within a networking environment. That is, the server 12 and/or processes performed by the server 12 can be integrated into the networking environment of any enterprise.

The server 12 includes a computing device 14 which can be resident on a network infrastructure or computing device. The computing device 14 includes a processor 20 (e.g., a CPU), a memory 22A, an I/O interface 24, and a bus 26. The bus 26 provides a communications link between each of the components in the computing device 14. In addition, computing device 14 includes a random access memory (RAM), a read-only memory (ROM), and an operating system (O/S). The computing device 14 is in communication with external I/O device/resource 28 and a storage system 22B. The I/O device 28 can comprise any device that enables an individual to interact with the computing device 14 (e.g., user interface) or any device that enables the computing device 14 to communicate with one or more other computing devices (e.g., devices 65a-n, etc.) using any type of communications link. The storage system 22B can store data such as one or more databases which can be maintained, for example, by an enterprise administrator.

The processor 20 executes computer program code (e.g., program control 44), which can be stored in memory 22A and/or storage system 22B. In embodiments, the program control 44 controls a test control 50 which comprises an application that is adapted to perform one or more of the processes described herein. The test control 50 can be implemented as one or more program code in program control 44 stored in memory 22A as separate or combined modules. Additionally, test control 50 may be implemented as separate dedicated processors or a single or several processors to provide the functions described herein. While executing the computer program code, processor 20 can read and/or write data to/from memory 22A, storage system 22B, and/or I/O interface 24. In this manner, the program code executes the processes of the invention.

According to aspects of the invention, test control 50 communicates with one or more mobile devices 65a, 65b, . . . , 65n, each of which has a copy of an application 70 to be tested. As used herein, a mobile device refers to a smart phone, tablet computer, personal digital assistant, or similar device that includes a mobile operating system, wireless communication antenna, processor, user interface, memory, etc. In embodiments, an agent 75 resides on each mobile device 65a-n and reports information about application 70 to test control 50 when application 70 is running. More specifically, in embodiments, agent 75 is configured to "remote control" mobile device, and by adding an agent to the device it is now possible to capture performance data of the device, e.g., application, and send this application information to the computing device, e.g., test control. In embodiments, test control 50 and more specifically computing device 14 may be implemented as or on a testing integrated development environment (IDE). In this way, the agent can be added to an application that sends native object information to the testing IDE including the dimensions and location of the object, the native ID, the class, and the text associated with the object, amongst other functionality and features.

In aspects of the invention, test control 50 may use agent 75 to remotely control the mobile devices 65a-n for testing purposes. The agent 75 may be one or more scripts or other suitable programming and may be added to application 70 when the application code is compiled. While application 70 is running on one of mobile devices 65a-n, agent 75 sends native object information to test control 50, such as for example: an identification of methods called by application 50; data inputs and data outputs associated with each called method; user inputs (e.g., taps, clicks, swipes, etc.); performance data from the device; dimensions and locations of objects on the mobile device screen; and the native ID, the class, and the text associated with each object, amongst other features and combinations thereof.

The program code can include computer program instructions which are stored in a computer readable storage medium. The computer program instructions may also be loaded onto a computer, other programmable data processing apparatus, or other devices to cause a series of operational steps to be performed on the computer. Moreover, any methods provided herein in the form of flowcharts, block diagrams or otherwise may be implemented using the computer program instructions, implemented on the computer readable storage medium.

The computer readable storage medium may be, for example an electronic, magnetic, optical, electromagnetic, infrared, and/or semiconductor system. More specific examples (a non-exhaustive list) would include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any combination thereof. Accordingly, the computer readable storage medium may be any tangible medium that can contain or store a program for use by or in connection with an instruction execution system, apparatus, or device of the present invention.

Figure 2:
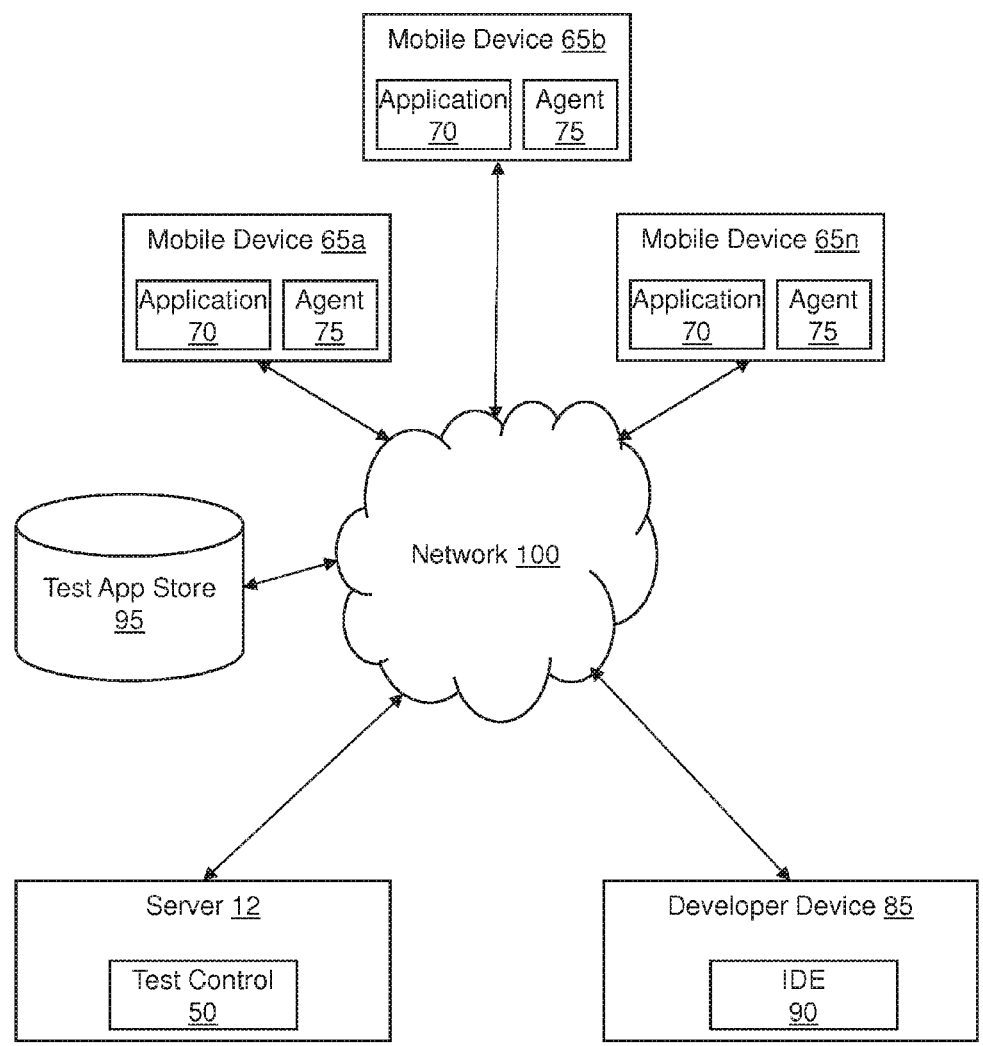
FIG. 2 shows a block diagram of an exemplary system in accordance with aspects of the invention.

FIG. 2 shows a block diagram of an exemplary system in accordance with aspects of the invention. In embodiments, the system includes server 12 (e.g., test server) that runs test control 50. The system may also include a developer computer device 85 comprising a developer IDE (integrated development environment) 90 which the developer uses to create an application. In embodiments, the developer instruments the application code for testing by configuring certain properties of the application using developer IDE 90, as discussed in greater detail below with respect to FIGS. 3 and 4. In aspects of the invention, when the application code is instrumented for testing, developer IDE 90 compiles the application code with the agent (e.g., agent library) that is adapted for communicating with test control 50 of the test management system (TMS). The developer computer device 85 submits the compiled application to a test app store 95. One or more mobile devices 65a-n may download application 70 including agent 75 from test app store 95. The server 12 including test control 50 may then communicate with agent 75 on devices 65a-n to control testing of application 70 on the devices 65a-n.

Still referring to FIG. 2, the various devices of the system may communicate via a network 100, which may be one or more conventional communication network types including, but not limited to: Internet, local area network (LAN), WiFi, etc. In one exemplary non-limiting environment, test app store 95 is a storage node in a cloud environment, and server 12 communicates with devices 65a-n locally, e.g., through LAN or WiFi.

Figure 3:
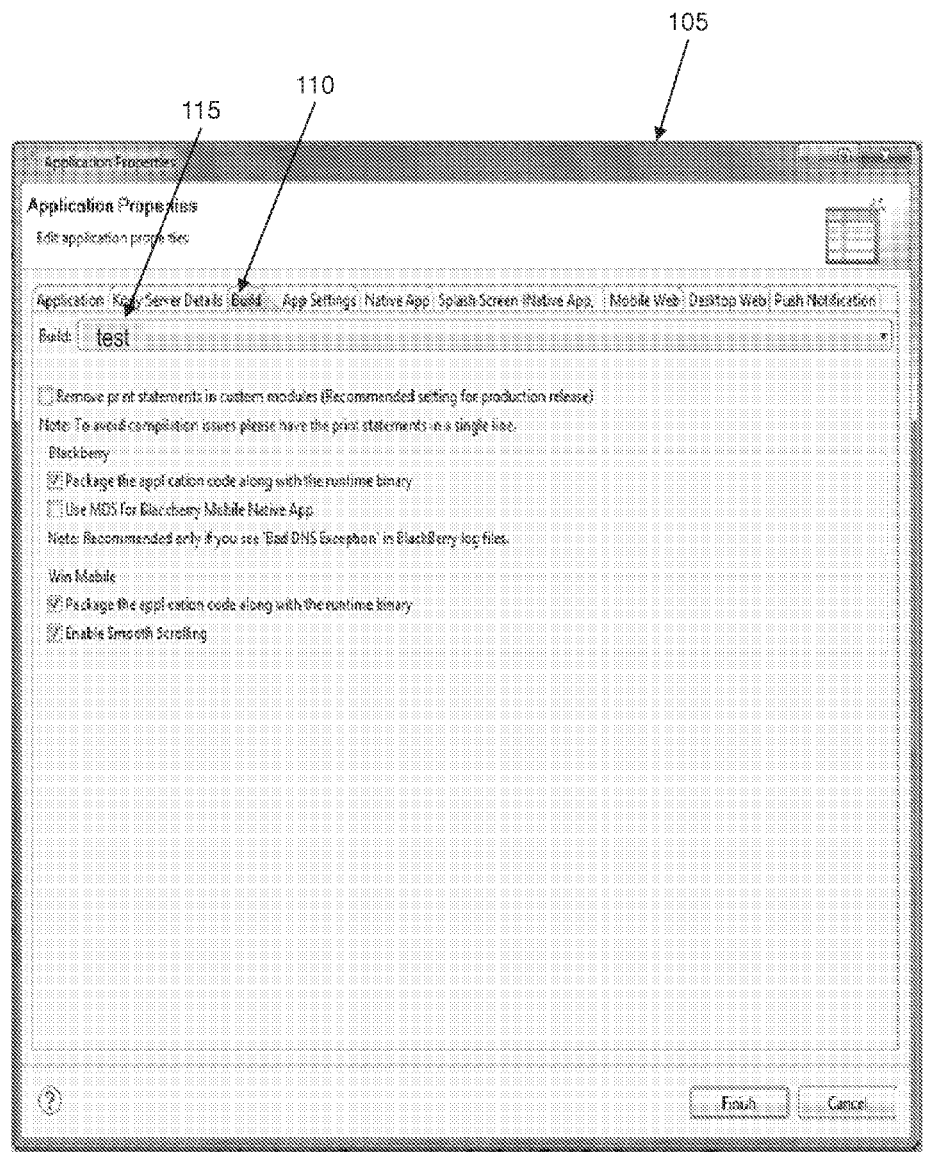
FIGS. 3-7 illustrate exemplary user interfaces and associated functionality in accordance with aspects of the invention.
Figure 4:
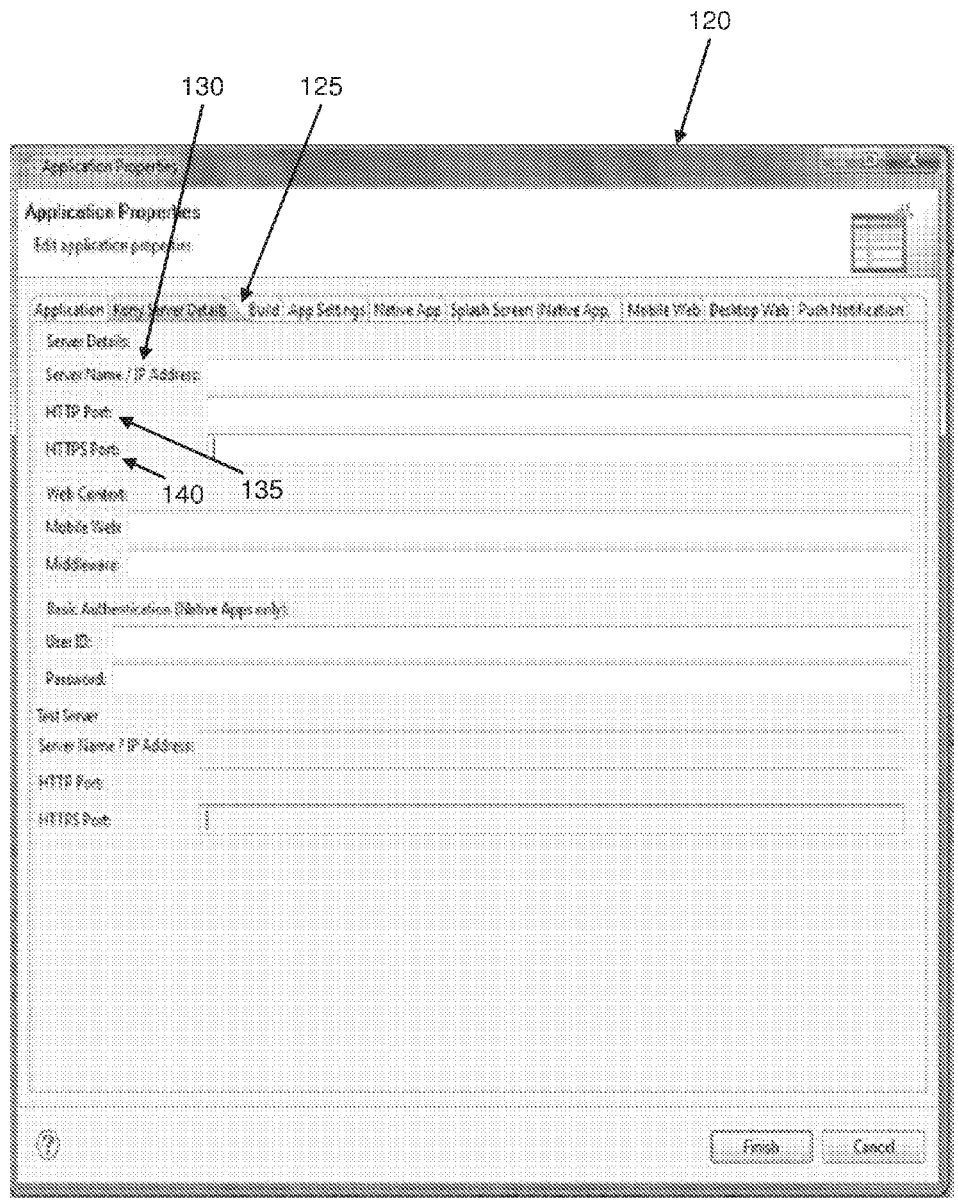

FIGS. 3 and 4 illustrate exemplary user interfaces and associated functionality of a developer IDE (e.g., developer IDE 90 of FIG. 2) in accordance with aspects of the invention. FIG. 3 shows an interface 105 in which a developer may instrument the application code for testing by selecting a test mode within the application properties. For example, under a "Build" tab 110 of the IDE there may be a menu 115 that permits the developer to select a build type such as, for example: release, debug, test, or test+debug. To instrument the application for testing, the developer selects test or test+debug. In embodiments, selecting the test or test+debug build type causes the IDE to inject the agent in the application when the application is compiled.

FIG. 4 shows an interface 120 in which a developer may instrument the application code for testing by defining a test server (e.g., server 12 with test control 50) within the application properties. For example, under "Server" tab 125 of the IDE there are fields that permit the developer to enter information regarding a server, such as: Server Name/IP Address 130, HTTP Port 135, HTTPS Port 140. In embodiments, the identity of the testing sever defined in interface 120 is injected in the compiled application as part of the agent library, e.g., to instruct the mobile device where to send test data when running the application.

Figure 5:
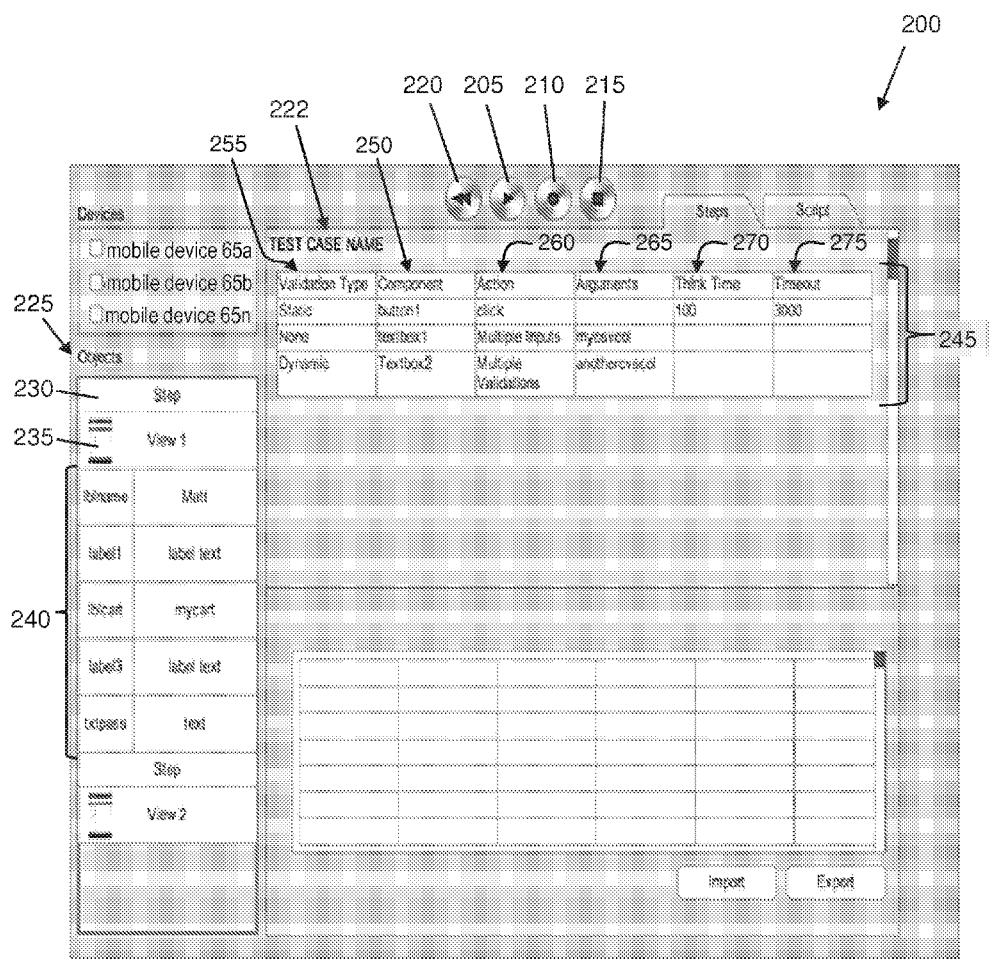

FIG. 5 illustrates an exemplary user interface (UI) 200 and functionality of a test workbench associated with a test control (e.g., test control 50) in accordance with aspects of the invention. In embodiments, the workspace provides features including recording, playback and other controls, object library, test steps and device selector. For example, the UI 200 supports record, stop, rewind and recording controls, provides a simple test step approach that shows the steps in an easy to read layout that includes validation of a component, the action, arguments, think time and timeout. The UI 200 will also support a scripting mode that leverages javascript to give the user more power to manually change test steps.

More specifically, in embodiments, UI 200 includes a play button 205, record button 210, stop button 215, and rewind button 220 that control the recording and playback of a test case 222. In aspects of the invention, the UI 200 has an Objects library 225 that displays the present step 230 in the test case 222, the view 235 generated (e.g., at the mobile device running the application) during the present step, and objects 240 reported by the mobile device for the view 235. In embodiments, the UI 200 includes a validation area 245 that shows components 250 validated in the test case 222, a validation type 255 for each component, an action 260 associated with each component, arguments 265 (if any) associated with each component, and a think time 270 and timeout time 275 (if any) associated with each component.

With continued reference to FIG. 5, one or more of the components 250 may be defined by the developer, e.g., as variables that should be watched during testing. For such developer defined components 250, at least one of the validation type 255, action 260, arguments 265, think time 270, and time out 275 may be pre-defined with default values, e.g., defined in the test libraries of the application code. In embodiments, the UI 200 is configured to permit a user to change one or more of the default values, e.g., by altering the data shown in a particular field (e.g., field 280), e.g., by placing a cursor in a field and entering a new value (e.g., by typing, pasting, etc.). In aspects of the invention, the UI 200 is adapted to permit a user to add an object from the Objects library 225 to the component validation area 245 in order to add validations to the test case 222.

Figure 6:
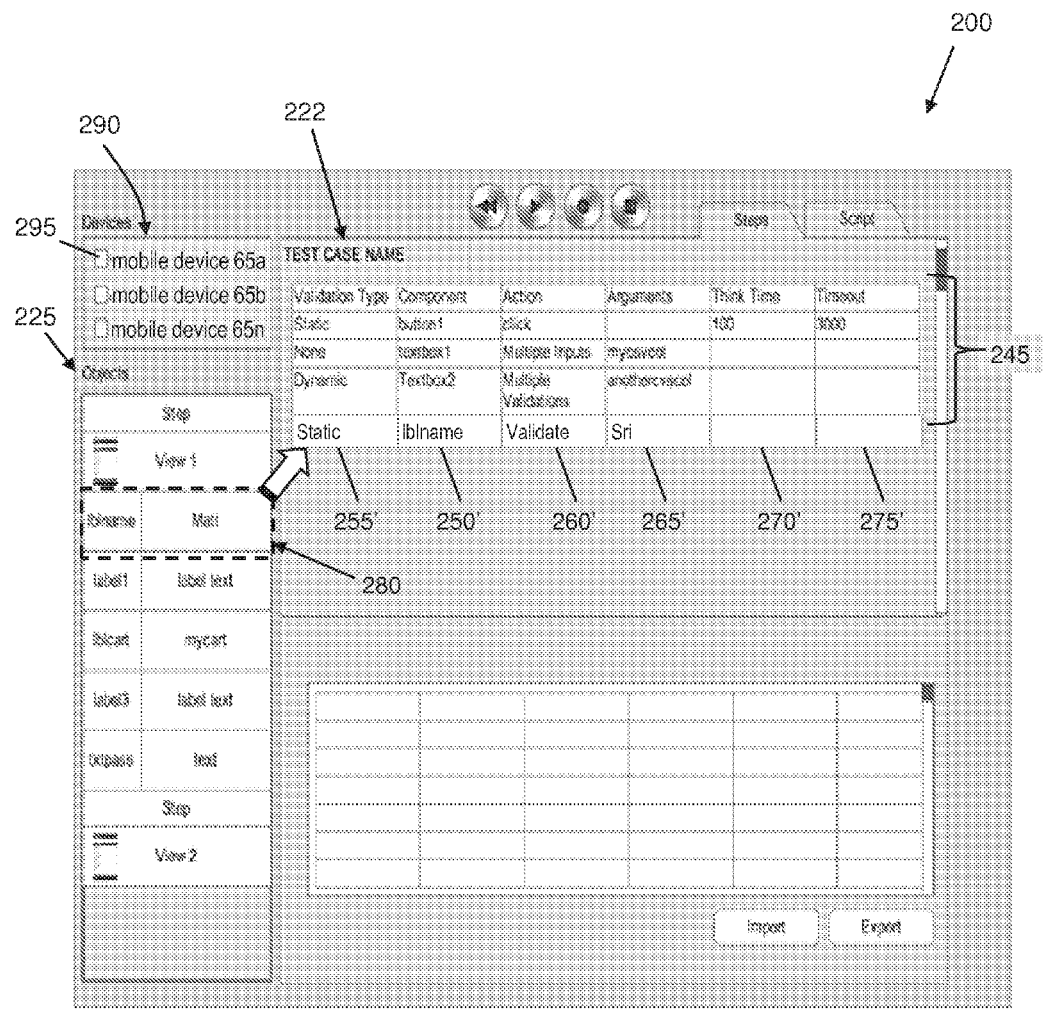

FIG. 6 shows an exemplary view of the UI 200 in which a user has added object 280 to the test case 222. The adding may be performed, for example, by dragging and dropping the object 280 from the Objects library 225 to the validation area 245 (by a drag and drop function using a mouse, for example). Upon adding the object 280 to the test case 222, the user may edit one or more fields 255', 260', 265', 270', and 275' to tailor the validation of this component in the test case. For example, the user may define an expected output (e.g., "Sri") in the argument field 265'. Changes made to the test case via UI 200 are saved by test control 50, e.g., in a test repository which may be part of storage system 22B of FIG. 1.

In embodiments, the UI 200 may also display a list 290 of mobile devices that are currently connected to the test server (e.g., server 12) via the test agent in the particular application. Each mobile device in the list 290 may be associated with a selection field 295 that permits a user to select the particular mobile device for either recording or running the test case. In this manner, a test case may be recorded from a first mobile device and run on a second different mobile device. In aspects of the invention, the application and the test case are programmed with logic that permits use on different native platforms (e.g., different mobile operating systems and devices), such that a test case may be recorded from a first device having a first operating system and then run on a second device having a second operating system different than the first operating system.

In embodiments, after a test case is recorded and saved using the test workbench (e.g., using the UI 200 of FIG. 5), the test case may be run against an application on a mobile device. When a tester runs a test case (e.g., by selecting a device from list 290 and hitting the play button 205), the test control (e.g., test control 50) sends execution commands to the application (e.g., application 70) via the agent (e.g., agent 75) at the mobile device (e.g., mobile device 65a). The execution commands cause the application to step through the test case (e.g., test case 222), in which case the test server (e.g., server 12) is remotely controlling the application during testing.

In embodiments, while the application is stepping through the test case, the agent (e.g., agent 75) at the mobile device acts as a reporter for the application by communicating back to the test control information such as: application performance, memory usage, visual layout, methods being called, and inputs and outputs from the screen of the mobile device in conjunction with any variables included in the test case, amongst other test control information. The test control receives the information from the agent and performs comparisons and/or testing logic as defined in the validations of the test case (e.g., at validation area 245). The test control then displays an output of the test case based on the information from the agent and the results of any comparisons and/or testing logic defined in the validations of the test case.

Figure 7:
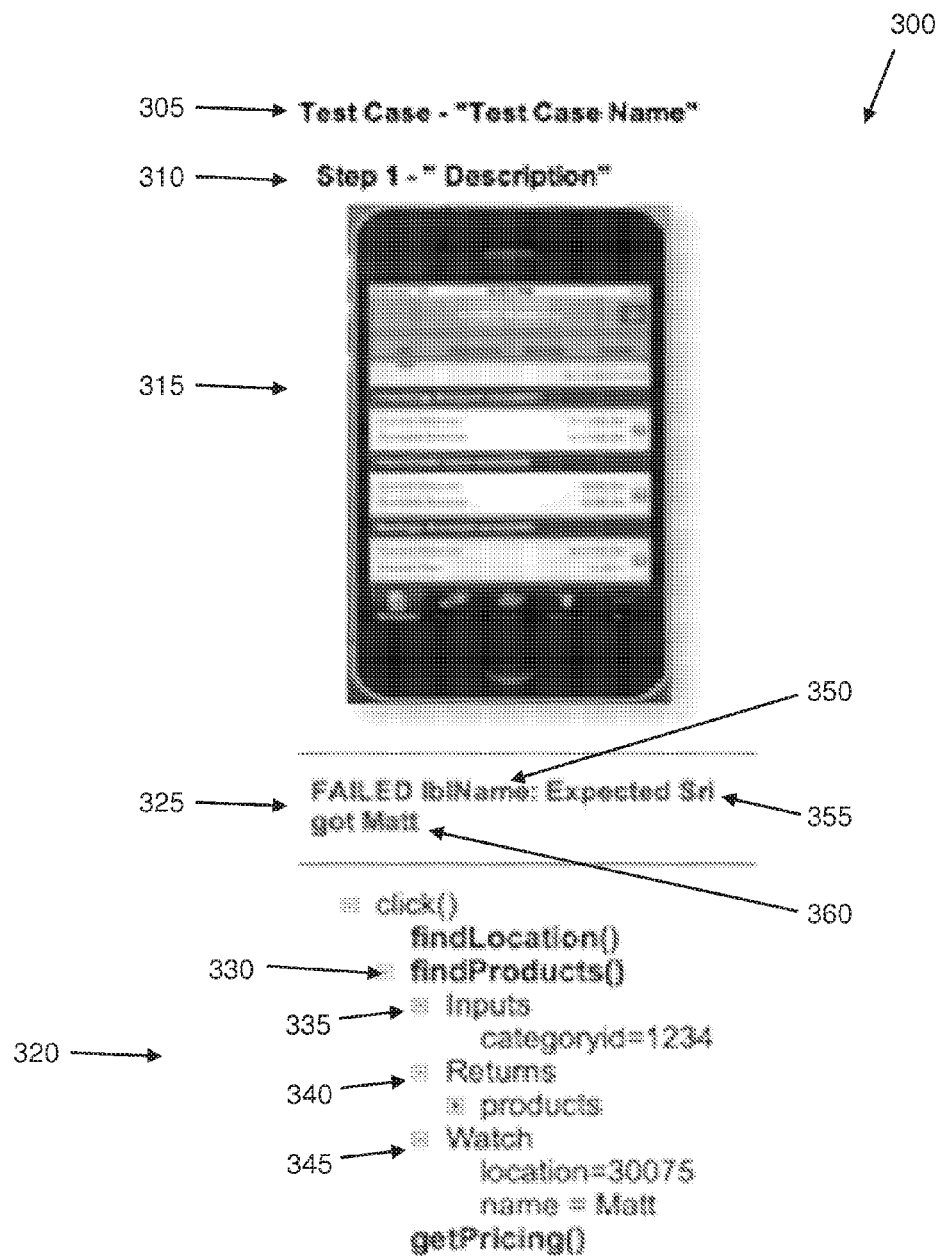

FIG. 7 shows an exemplary output 300 of running a test case against an application on a mobile device in accordance with aspects of the invention. In embodiments, the output 300 may include: test case name 305; step 310 (e.g., which may correspond to step 230); a screenshot 315 as seen on the mobile device for this step; a list 320 of functions called in this step; and a failure 325 (if any). In aspects of the invention, list 320 includes a function name 330 of a function (e.g., method) called by the application (e.g., "find-Products( )"), any inputs 335 to the function, any returns 340 from the function, and the value of any "watch" variables defined in the test case, all of which are reported to the test control by the agent. This allows the developer an opportunity to visualize what functions were called, and see critical variables the developer wants to see or provided by looking at the inputs and returns from functions.

In embodiments, the screenshot 315 provides the tester with a screen shot of the resulting function. In embodiments, the failures 325 displays a component name 350 (e.g., as defined in field 250 of test case 222), the expected value 355 of the component (e.g., as defined in field 265 of test case 222), and the actual value 360 of the component when the application was run on the mobile device (e.g., as reported by the agent). In this manner, the output 300 permits a tester to quickly find failures on the screen by validating objects in the view such as input boxes and text.

Flow Diagrams

FIGS. 8-12 show flow diagrams (e.g., sequence diagrams or swim lane diagrams) implementing aspects of the present invention. The flow diagrams may equally represent a high-level block diagram or a swim-lane diagram of the invention. The steps of the flow diagrams may be implemented and executed, for example, from either a server, in a client-server relationship, or they may run on a user workstation with operative information conveyed to the user workstation. Furthermore, steps of the processes of the invention may be implemented using a computer-readable storage medium having program code for use by or in connection with a computer or any instruction execution system. The software and/or computer program product can be implemented in the environments of FIGS. 1-7. For example, as depicted in FIGS. 8-12, "Device" may refer to one of mobile devices 65a-n, "Application" may refer to application 70, and "Test Management System" may refer to server 12 running the test control 50 as described with respect to FIGS. 1-7.

Figure 8:
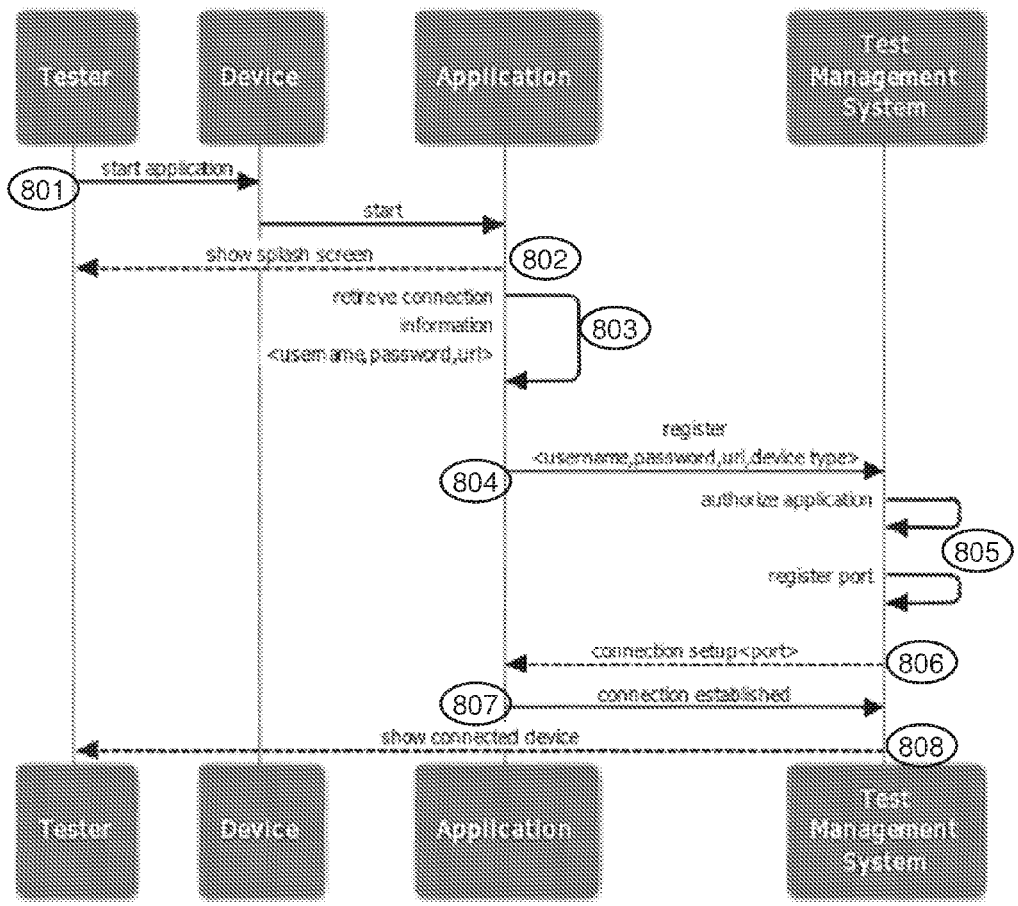
FIGS. 8-12 show flow diagrams of methods in accordance with aspects of the invention.

FIG. 8 shows a flow diagram of agent registration in accordance with aspects of the invention. More specifically, in the example of FIG. 8, an application (e.g., application 70) for testing is loaded on a device (e.g., mobile device 65a). The application is instrumented for testing and includes an agent (e.g., agent 75) as described herein. At step 801, the tester opens (e.g., invokes) the application at the device. At step 802, the agent presents a splash screen on the device that informs the tester the device is instrumented for testing (e.g., the application is in test mode). At step 803, the agent retrieves the server connection information (e.g., server name 130 from FIG. 4) for contacting the Test Management System (TMS) (e.g., server 12 running test control 50). The agent then uses the URL (URL is kept as property) of the server to communicate to the TMS to establish a connection, e.g., HTTP connection. At step 804, the agent transmits data defining the type of device it is running on, a username, password and the name of the agent itself to the TMS for registration; although other information can also be provided. At step 805, the TMS authorizes the device, e.g., by authenticating the username and password sent from the agent. At step 806, the TMS sends the connection information back to the agent. At step 807, the agent establishes (assigns) a connection on a new port. At step 808, the TMS shows that the device is connected (e.g., via list 290 of UI 200). It should be understood that when the device is registered, the type of device is also recorded. The agent and TMS may communicate via any suitable communication, such as wireless communication between mobile device and test server.

Figure 9:
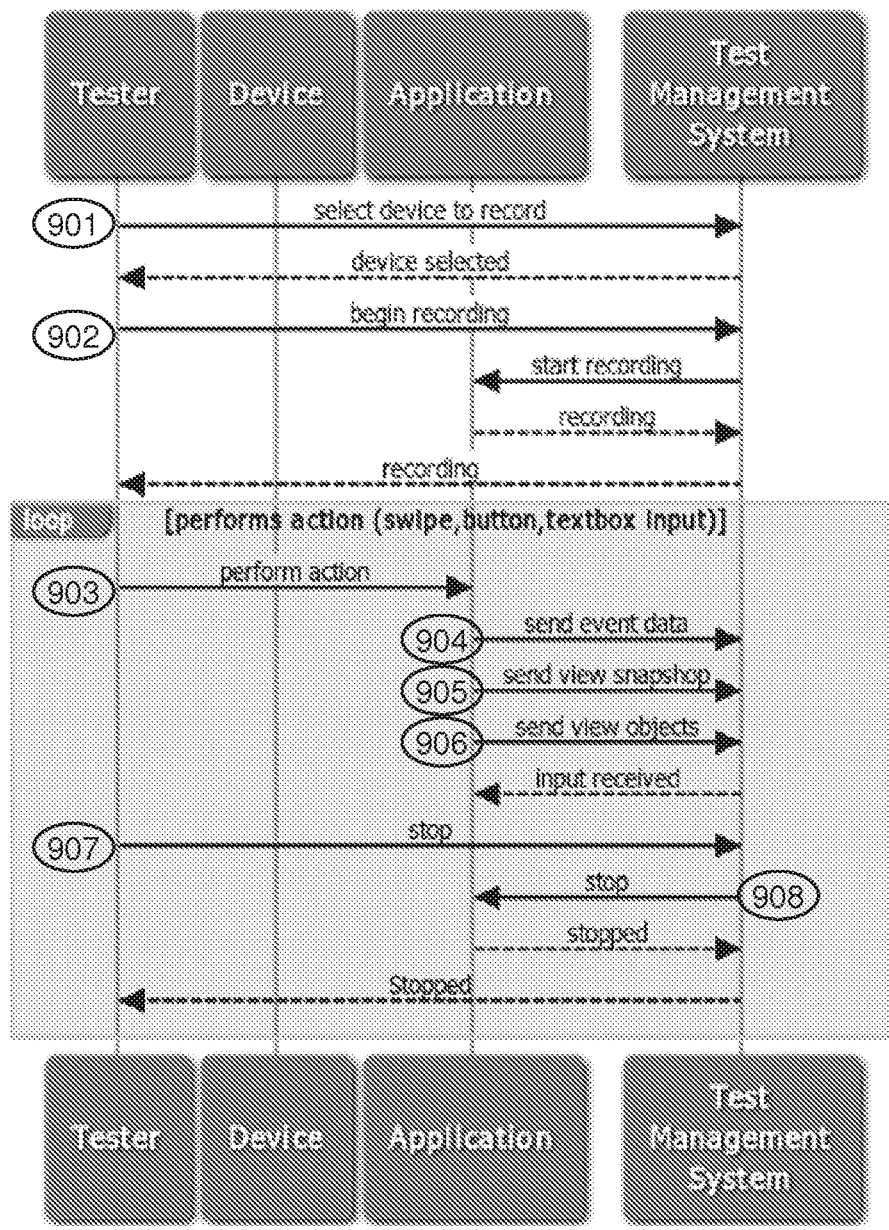

FIG. 9 shows a flow diagram of recording a test case in accordance with aspects of the invention. In this flow, the actors include: tester, a device which includes agent (which contains an agent library that communicates with TMS), and the TMS (which includes IDE). In embodiments, preconditions of the processes of FIG. 9 include, e.g., agent has been instrumented with the agent library and the device is registered and connected to the TSM.

In embodiments of FIG. 9, when a tester wants to record a test case, the tester can select the device they want to record it on from a testing workbench. After selecting the connected device, the tester can select a record button on the testing workbench. The agent sends the properties of each native object displayed on the view. When a user performs an event, such as a button tap, the agent sends the information about what event was performed and the object it was performed against to the TMS. When a new view is displayed, as the result of an event, the objects within the view are sent to the TMS. The TMS records all the objects for each view for later editing. The agent also sends a screenshot of the view to the TMS. When the tester completes the recording process, a stop button is selected on the testing workbench. The TMS can then send a stop request to the agent which stops sending recording data to the Test Management Server. In this way, the test recorded to the workbench is provided in a step by step format, with the test recorded in, for example, javascript format allowing the user to manipulate the actual scripting. Also, advantageously, the object data from each page as well as each action performed is sent to the TMS. Thus, all inputs recorded are sent to the TMS.

More specifically, at step 901, the tester selects a device with which to work (e.g., via list 290 of UI 200). At step 902, the tester presses the record button (e.g., button 210 of UI 200) and the TMS begins recording the test case. During recording, the agent sends to the TMS the functional data of the application (e.g., methods called, method inputs, method returns, etc.). For example, when a user performs an action at step 903, such as a button tap, swipe, textbox input, etc., then, at step 904, the agent sends to the TMS information about what application event was performed and the application object it was performed against. At step 905, the agent sends to the TMS a screenshot of each application view when the view changes. This gives the tester a reference point to see when an event or input was received and what effect it had on the view. At step 906, the agent sends to the TMS each object within the view. The TMS records all the functional data and objects for each view for later editing. At step 907, the tester presses the stop button (e.g., button 210 of UI 200) and the TMS stops recording the test case. At step 908, the TMS sends a stop request to the agent telling the agent to stop sending data to the TMS.

Figure 10:
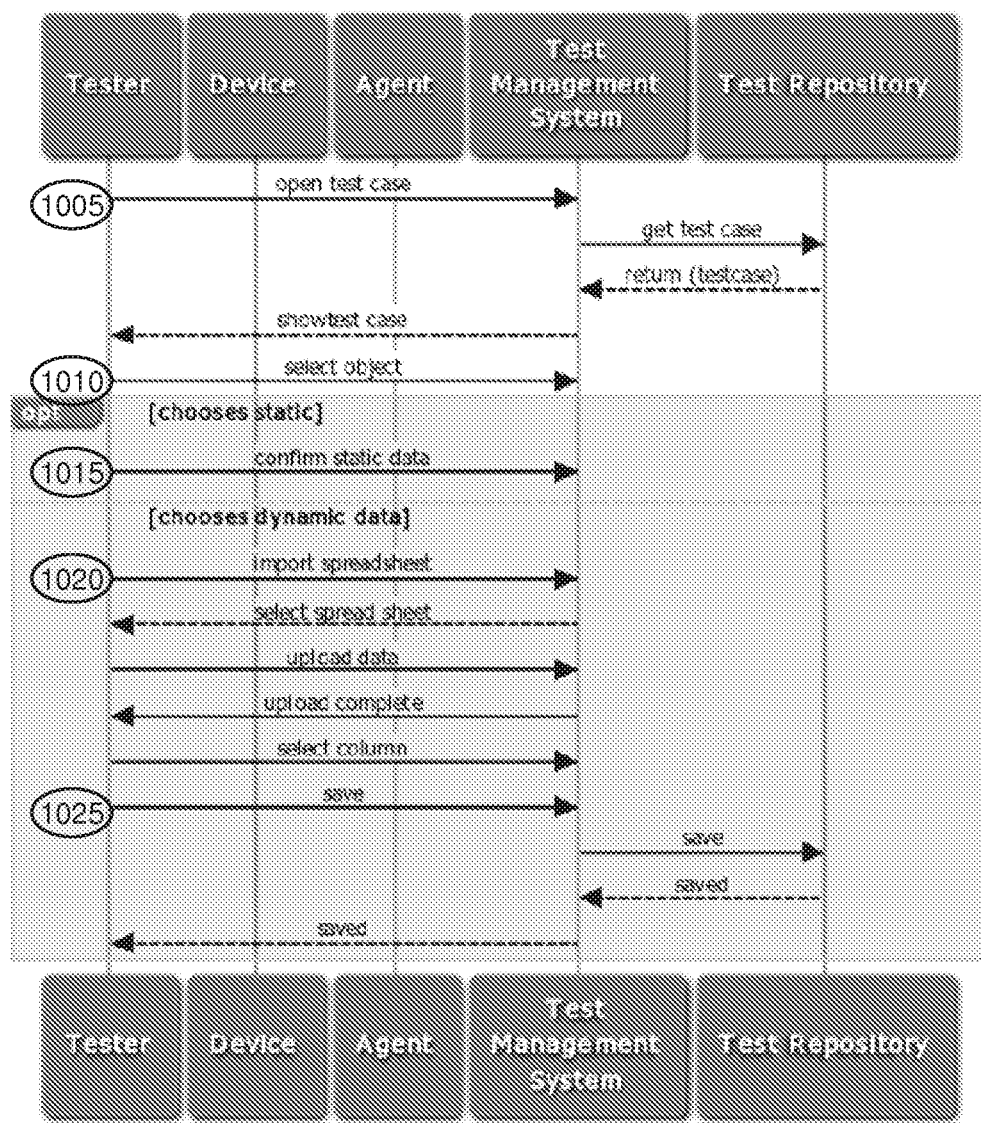

FIG. 10 shows a flow diagram of editing validations of a test case in accordance with aspects of the invention. In this flow, the actors include: tester (who edits test cases), the TMS (which contains the workbench that allows the tester to edit test cases) and a test repository (used to store test cases). In embodiments, a tester can retrieve and save test cases in the repository. In embodiments, preconditions for providing the processes of FIG. 10 include, for example, the test case is recorded and saved within the repository. The post conditions include, e.g., validations set within the test case and the test case is saved.

In embodiments using the processes of FIG. 10, the tester retrieves a test case from the test repository into the TMS. The tester pulls an object from the object store that was recorded with the test case and places it on the desired step. The tester then selects to validate the object from a drop down menu, for example. The object loads the recorded properties into a view on the screen, the tester selects multiple runs in the properties and selects a CSV file from their local device, assigning a column of the spreadsheet to the input field for multi run validation. In embodiments, the tester can edit a test case they just finished recording and/or edit a validator to check for a single response.

More specifically, at step 1005, the tester loads a stored test case from a test repository (e.g., storage system 22B) into the test workbench (e.g., UI 200). At step 1010, the tester pulls an object from the object library that was recorded with the test case (e.g., object library 240) and places the object at a desired location in the list of validations (e.g., validations 245). Step 1010 may be performed in a manner similar to that described with respect to FIG. 6. In the event the object is associated with static data, then at step 1015 the tester indicates (confirms) static data (e.g., at field 255' of UI 200) and enters any other desired data in fields associated with the object (e.g., fields 260', 265', 270', 275'). In the event the object is associated with dynamic data, then step 1020 the tester indicates dynamic data (e.g., at field 255'), indicates multiple validations (e.g., at field 260'), and selects a spreadsheet file from their local device and assigns a column of the spreadsheet to the input field (e.g., field 265') for a multi-run validation. At step 1025, the tester saves the test case using the UI, and the TMS saves the test case at the test repository.

Figure 11:
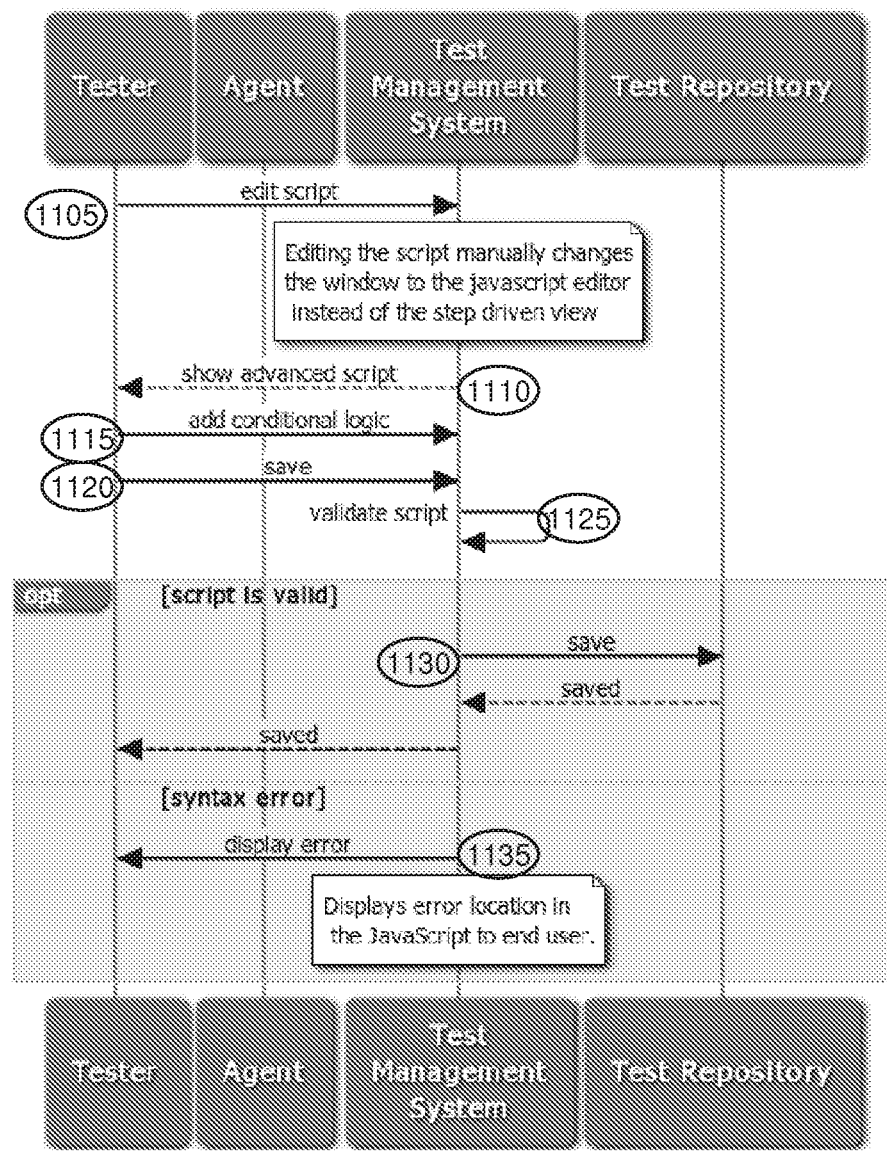

FIG. 11 shows a flow diagram of editing test case validations with tolerances in accordance with aspects of the invention. In this flow, the actors include: tester (who edits test cases), the TMS (which contains the workbench that allows the tester to edit test cases) and a test repository (used to store test cases). In embodiments, preconditions for providing the processes of FIG. 11 include, for example, the test case is recorded and saved within the repository, and opened for editing. The post conditions include, e.g., validations set within the test case and the test case is saved.

In embodiments, the tester can use the test workbench to test a range of tolerances, search for a specific word or other validation by editing the underlying script that is created by the recording process. By way of example, the tester can open the test case up and select to edit a script. Once the script is opened, the test can add a validation to compare an object to a range, regular expression or other validation summarized herein. When a test case is saved after editing, the test script is checked to insure the syntax is correct. For example, Test scripts should support exact equalities (==);
Regular expressions;
Determine if the value is undefined;
Determine if the value is defined;
Determine if a value is null;
Determine if the resulting value is true or false;
Determine <, >, <=, >=;
Support close to for comparing floating point;
Support the ability to determine when exceptions have been thrown as expected; and/or
Support multiple acceptable outputs for a unit test.

More specifically, at step 1105, the tester opens a saved test case (e.g., similar to step 1005) and chooses to edit the script (e.g., via UI 200). Selecting to edit the script in the UI automatically changes the UI window to a JavaScript editor instead of the step drive view shown in FIG. 5. As such, at step 1110, the TMS shows the script in a script editor. At step 1115, the tester manually edits the script by adding a validation to for example: compare an object to a range;

determine an exact equality; determine if a value is undefined; determine if a value is defined; determine if a value is null; determine if a value is true or false; determine if a value greater than, less than, greater than or equal to, less than or equal to another value; determine if a value is close to another value (e.g., a result is close to 3.14); determine when exceptions have been thrown as expected; etc. At step 1120, the tester saves the script. At step 1125, the TMS validates the stored script to determine whether syntax is correct. When the syntax is correct, then at step 1130 the TMS saves the edited script to the test repository. When the syntax has an error, then at step 1135 the TMS displays the error to the tester via the UI.

Figure 12:
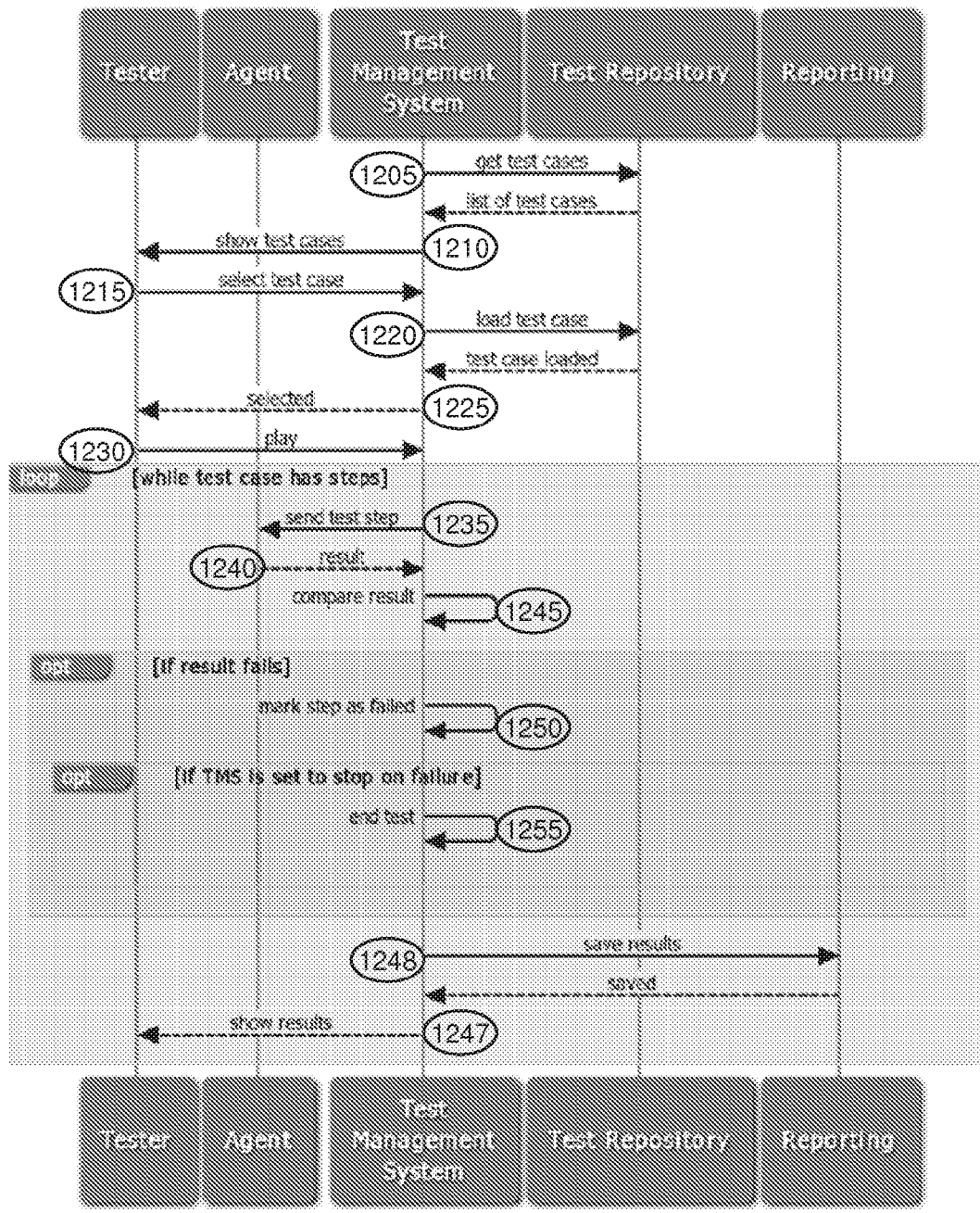

FIG. 12 shows a flow diagram of running a test case against an application in accordance with aspects of the invention. In this flow, the actors include: tester (who runs test cases), the TMS (which controls the playback), a reporting component (that stores the results of a testing run), a test repository (used to store test cases and where a tester can retrieve and save test cases) and an agent. In embodiments, preconditions for providing the processes of FIG. 12 include, for example, the test case is recorded and saved within the repository, and a device (for testing) is connected to the TMS. The post conditions include, e.g., validation each step of the test case and the results are sent to the reporting component.

In embodiments, the tester selects a test (or group of test) to run and the devices that they want to execute functional testing on. The tester selects play for the test cases and the TSM executes the test cases in the order they are selected. The TSM sends the testing step to the agent, and the Agent performs the event and sends back the view of the page after the event is completed. The agent also sends any introspected data and UI inputs and outputs for comparison by the TSM. The TSM can then compare the expected results of the event with the actual results sent by the agent. If an expected result does not match an actual result then the step fails. When the test case is complete, the results of the test case are sent to the reporting engine along with the time the test case ran, the name of the test case and the name of the test scenario (if declared), for example.

In embodiments, the processes (and systems) of the present invention are also configured for the following additional/alternative actions:
- The tester has the ability to pause, or step through the test case event by event;
- The tester can record a user experience test case while playing a functional test case;
- The test case can be run via a scheduled event;
- The test cases can run via a remote call from an external system such as a build automation system;
- The tester can run a group of test to run; and/or
- If the test case fails, the TMS checks to see if the stop testing on failure parameter was set and, if so, it stops testing and saves results.

More specifically, at step 1205, the TMS retrieves a list of one or more saved test cases from the test repository, e.g., based on tester log in credentials. At step 1210, the TMS shows the one or more test cases to the tester via the UI (e.g., UI 200). At step 1215, the tester selects a test case from the one or more test cases (e.g., using the UI 200). At step 1220, the TMS loads the selected test case from the test repository. At step 1225, the TMS displays the loaded test case to the tester via the UI. At step 1230, the tester uses the UI to play the test case on one or more devices. In embodiments, step 1230 includes the tester selecting one or more devices (e.g., via list 290) and then pressing the play button (e.g., button 205).

Still referring to FIG. 12, at step 1235, the TMS communicates the next test step (e.g., as defined by the loaded test case) to the agent at the device. At step 1240, the agent causes the application to perform the received test step, and the agent communicates the result of the test step to the TSM. Step 1240 may include, for example, the agent performing an event and sending to the TSM a view of the page after the event was completed. Step 1240 may also include the agent sending to the TSM any introspected data (e.g., data marked for watching, validation, etc.), and any user inputs and outputs at the device. At step 1245, the TSM compares the result (e.g., from step 1240) to the expected values (e.g., as defined in the test case, e.g., at field 265). In the event the test step did not fail the comparison at step 1245, then at step 1247 the TMS shows the result of the test step (e.g., via output 300) and the process returns to step 1235 where the TMS communicates the next test step to the agent. At step 1248, the TSM may also save the results of the test step to a reporting component (e.g., storage system 22B) that stores results of a test run.

In the event the test step failed the comparison at step 1245, then at step 1250 the TSM marks the test step as failed. If the TMS is set to stop the test at the first failure, then at step 1255 the TMS ends the test case and shows the result at step 1247 and saves the results at step 1248. On the other hand, if the TMS is not set to stop on failure, then the TMS shows the result at step 1247, saves the results at step 1248, and the process returns to step 1235 where the TMS communicates the next test step to the agent.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing examples have been provided for the purpose of explanation and should not be construed as limiting the present invention. While the present invention has been described with reference to an exemplary embodiment, Changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed is:

1. A method of application testing, comprising:
transmitting a command to an agent associated with an application installed on a mobile device;
receiving from the agent information about an executed step of the application on the mobile device;
comparing the information to an expected value of the step;
display an output based on the comparing; and
saving the expected value in a test case, wherein at least one of the transmitting, the receiving, the comparing, and the displaying are performed by a computing device, and wherein the displaying the output comprises displaying a failure indicator when the information differs from the expected value.

2. The method of claim 1, wherein the saving the expected value comprises inputting a value of a static result into the test case.

3. The method of claim 1, wherein the saving the expected value comprises inputting a plurality of values of a dynamic result into the test case.

4. The method of claim 1, wherein the displaying the failure indicator comprises displaying an object name, the expected value, and an actual value associated with the object name.

5. The method of claim 1, wherein the information about the executed step of the application comprises a function called by the application, an input to the function, and a return of the function based on the input, and wherein at least one of:

the output displays a name of the function, the input to the function, and the return of the function;

the output displays a screenshot of the mobile device associated with the executed step; and the output displays a watch variable designated in code of the application.

6. The method of claim 1, wherein the command instructs the agent to cause the application to perform the executed step.

7. The method of claim 1, wherein application code of the application is compiled with the agent such that the application includes the agent.

8. The method of claim 1, wherein the transmitting the command comprises commanding the agent to run a test case, the method further comprising:

modifying the test case to produce a modified test case; and transmitting a command to the agent to run the modified test case.

9. The method of claim 1, further comprising:

displaying a play button, a record button, a stop button, and a rewind button for controlling the recording and playback of the test case.

10. The method of claim 1, further comprising displaying a user interface including a build tab configured to permit a user to select a build type for compiling the application.

11. The method of claim 10, wherein the build type includes at least one of release, debug, test or test and debug.

12. The method of claim 1, further comprising displaying a workspace for testing which includes controls for at least one of recording, playback, and object library, test steps and device selection.

13. A system for testing applications, comprising:

a test server comprising a test control is adapted to:

record a test case of a mobile application;

remotely control running the test case on a mobile device, wherein the test server remotely controls the running the test case by transmitting control signals to an agent loaded with the mobile application on the mobile device;

receive information about execution of the mobile application during the test case on the mobile device;

compare the information to an expected result; and display an output based on the comparing.

14. The system of claim 13, wherein the information about the execution of the mobile application comprises a function called by the mobile application, an input to the function, and a return of the function based on the input, and wherein at least one of:

displaying comprises displaying a name of the function, the input to the function, and the return of the function;

determining a failure based on the comparing, wherein the displaying comprises displaying a failure indicator comprising an object, an expected value of the object, and an actual value of the object; and the information further comprises data defining a screenshot of the mobile device during the test run, and the displaying comprises displaying the screenshot.

15. The system of claim 14, wherein the test controller is further adapted to:

stop the test upon determining the failure.

16. The system of claim 14, wherein:

the information further comprises a value of a watch variable defined in a test library of the mobile application; and the displaying comprises displaying the value of a watch variable.

17. The system of claim 13, wherein the test server receives the information from the agent.

18. The system of claim 13, wherein the test controller is further adapted to:

modify the test case to produce a modified test case; and transmit a command to the agent to run the modified test case.

19. The system of claim 13, wherein the test controller is further adapted to:

display a play button, a record button, a stop button, and a rewind button for controlling the recording and playback of the test case.

20. A computer system for testing an application, the system comprising:

one or more computer processors;

a computer readable hardware storage device;

program instructions stored on the computer hardware storage device for execution by the one or more computer processors, the program instructions comprising:

program instructions to communicate with an agent loaded on a mobile device to remotely control running a test case of the application on the mobile device;

program instructions to receive, from the agent loaded on the mobile device, information associated with a function called by the application during the test case on the mobile device, wherein the information comprises a name of the function, an input to the function, and a return of the function based on the input;

program instructions to display the information and a screenshot of the mobile device associated with the function, wherein the receiving and the displaying are performed at a test server that is separate from the mobile device; and the application includes the agent and is installed on the mobile device.

21. The computer system of claim 20, the program instructions further comprising:

program instructions to modify the test case to produce a modified test case; and program instructions to transmit a command to the agent to run the modified test case.

22. The computer system of claim 20, the program instructions further comprising:

displaying a play button, a record button, a stop button, and a rewind button for controlling the recording and playback of the test case.

* * * * *